(12) United States Patent
Hawtof et al.

(10) Patent No.: US 6,565,823 B1
(45) Date of Patent: *May 20, 2003

(54) METHOD AND APPARATUS FOR FORMING FUSED SILICA BY COMBUSTION OF LIQUID REACTANTS

(75) Inventors: Daniel W. Hawtof, Painted Post, NY (US); Danny L. Henderson, Wilmington, NC (US); Greg E. Smith, Corning, NY (US); Eric H. Urruti, Big Flats, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/767,653

(22) Filed: Dec. 17, 1996

Related U.S. Application Data (60) Provisional application No. 60/008,889, filed on Dec. 19, 1995.

(51) Int. Cl.$^7$ .............................................. C01B 33/12
(52) U.S. Cl. ......................................... 423/337; 65/414
(58) Field of Search ......................... 423/337; 239/290; 65/414

(56) References Cited

U.S. PATENT DOCUMENTS

| | | | |
|---|---|---|---|
| 2,188,121 A | 1/1940 | Smith .......................... 47/78.1 |
| 2,239,551 A | 4/1941 | Dalton et al. ................... 49/79 |
| 2,269,059 A | 1/1942 | McLachlan ................... 23/140 |
| 2,272,342 A | 2/1942 | Hyde .......................... 49/78.1 |
| 2,326,059 A | 8/1943 | Nordberg ...................... 106/52 |
| 3,117,838 A | 1/1964 | Sterling et al. ................ 23/182 |
| 3,416,890 A | 12/1968 | Best et al. ..................... 23/182 |
| 3,486,913 A | 12/1969 | Zirngibl et al. .............. 106/288 |
| 3,489,579 A | 1/1970 | Steverding .................... 106/52 |
| 3,666,414 A | 5/1972 | Bayer .......................... 106/52 |
| 3,698,936 A | 10/1972 | Moltzen ................... 117/105.2 |
| 3,883,336 A | 5/1975 | Randall .......................... 65/18 |
| 4,165,223 A | 8/1979 | Powers ............................ 65/2 |
| 4,242,487 A | 12/1980 | Yajima et al. ................. 528/25 |
| 4,414,164 A | 11/1983 | Roba et al. ................... 264/1.2 |
| 4,436,765 A | 3/1984 | Feng et al. ..................... 427/74 |
| 4,491,604 A | 1/1985 | Lesk et al. ...................... 427/8 |
| 4,501,602 A | 2/1985 | Miller et al. .................. 65/18.2 |
| 4,529,427 A | 7/1985 | French ......................... 65/3.12 |
| 4,810,673 A | 3/1989 | Freeman ..................... 437/239 |
| 5,043,002 A | 8/1991 | Dobbins et al. .............. 65/3.12 |
| 5,108,665 A | 4/1992 | Crooker et al. ................. 264/6 |
| 5,110,335 A | 5/1992 | Miller et al. .................. 65/3.12 |
| 5,152,819 A | 10/1992 | Blackwell et al. ........... 65/3.12 |
| 5,170,727 A | 12/1992 | Nielsen ....................... 110/346 |
| 5,268,337 A | 12/1993 | Katz et al. ..................... 501/94 |
| 5,297,738 A | 3/1994 | Lehr et al. ................... 239/708 |
| 5,458,681 A | 10/1995 | Hasegawa et al. .......... 106/490 |
| 5,622,750 A | 4/1997 | Kilian et al. ............. 427/163.2 |
| 5,979,185 A | * 11/1999 | Blackwell ................... 65/17.4 |
| 6,079,225 A | 6/2000 | Ruppert et al. .............. 65/17.2 |

FOREIGN PATENT DOCUMENTS

| | | | |
|---|---|---|---|
| EP | 0026625 B1 | 9/1980 | ..................... 37/25 |
| EP | 0463783 A1 | 6/1991 | ..................... 37/14 |
| EP | 0709487 A1 | 10/1995 | ..................... 16/44 |
| JP | 56-14438 | 2/1981 | |
| JP | 58-213639 | 12/1983 | |
| JP | 60-90838 | 5/1985 | |
| JP | 60-108338 | 6/1985 | ..................... 37/18 |
| JP | 1-138145 | 5/1989 | |
| RU | 1044599 | 9/1983 | |
| RU | 1421256 | 8/1988 | |

OTHER PUBLICATIONS

"Atomization and Sprays", Arthur H. Lefebvre, Purdue University, 1989, Hemisphere Publishing Co., Table of Contents, p. ix–25, 105–153 (preface, Chapters 1 & 4) no month.

"Liquid Atomization", L. Bayvel, Z. Orzechowski, 1993, Taylor & Frances Publishing, Table of Contents, p. vii–36, 159–236, 457–462 (preface, Chapters 1 & 4, subject index) no month.

U.S. patent application Ser. No. 08/574,961, Henderson et al., filed Dec. 19, 1995.

* cited by examiner

*Primary Examiner*—Stuart L. Hendrickson
(74) *Attorney, Agent, or Firm*—Joseph M. Homa; Robert L. Carlson; Edward F. Murphy (57) ABSTRACT

The present invention is directed to a method for making fused silica glass. A liquid, preferably halide-free, silicon-containing compound capable of being converted by thermal oxidative decomposition to $SiO_2$ is provided and introduced directly into the flame of a combustion burner, thereby forming finely divided amorphous soot. The amorphous soot is deposited on a receptor surface where, either substantially simultaneously with or subsequently to its deposition, the soot is consolidated into a body of fused silica glass. The invention further relates to an apparatus for forming fused silica from liquid, preferably halide-free, silicon-containing reactants which includes: a combustion burner which, in operation, generates a flame; an injector for supplying a liquid silicon-containing compound to the flame to convert the compound by thermal oxidative decomposition to a finely divided amorphous soot; and a receptor surface on which the soot is deposited.

20 Claims, 4 Drawing Sheets

METHOD AND APPARATUS FOR FORMING FUSED SILICA BY COMBUSTION OF LIQUID REACTANTS

This application claims the benefit of provisional application No. 60/008,889 filed Dec. 19, 1995.

FIELD OF THE INVENTION

The present invention relates to the formation of fused silica and, more particularly, to a method and apparatus for forming fused silica from liquid silicon-containing compounds.

BACKGROUND OF THE INVENTION

Various processes are known in the art that involve the production of metal oxides from vaporous reactants. Such processes require a feedstock solution, a means of generating and transporting vapors of the feedstock solution (hereafter called vaporous reactants) and an oxidant to a conversion reaction site, and a means of catalyzing oxidation and combustion coincidentally to produce finely divided, spherical aggregates, called soot. This soot can be collected on any deposition receptor in any number of ways ranging from a collection chamber to a rotating mandrel. It may be simultaneously or subsequently heat treated to form a non-porous, transparent, high purity glass article. This process is usually carried out with specialized equipment having a unique arrangement of nozzles and burners.

Much of the initial research that led to the development of such processes focused on the production of bulk fused silica. Selection of the appropriate feedstock was an important aspect of that work. Consequently, it was at that time determined that a material capable of generating a vapor pressure of 200–300 millimeters of mercury (mm Hg) at temperatures below 100° C. would be useful for making such bulk fused silica. The high vapor pressure of silicon tetrachloride ($SiCl_4$) suggested its usefulness as a convenient vapor source for soot generation and launched the discovery and use of a series of similar chloride-based feedstocks. This factor, more than any other, is responsible for the presently accepted use of $SiCl_4$, $GeCl_4$, $POCl_3$, and $BCl_3$ as vapor sources, even though these materials have certain chemically undesirable properties.

Silicon, germanium, zirconium, and titanium are metals often used in halide form as vaporous reactants in forming metal oxide glasses. However, $SiCl_4$ has been the industry standard over the years for the production of high purity silica glasses. As disclosed in U.S. Pat. No. 3,698,936, one of several reactions may be employed to produce high purity fused silica via oxidation of $SiCl_4$; namely:

$$SiCl_4+O_2 \rightarrow SiO_2+2Cl_2, \quad (1)$$

$$SiCl_4+\tfrac{2}{3}O_3 \rightarrow SiO_2+2Cl_2, \text{ or} \quad (2)$$

$$SiCl_4+2H_2O \rightarrow SiO_2+4HCl, \quad (3)$$

whereby burners or jet assemblies are utilized in feeding the reactant gases and vapors to a reaction space. It should be noted that reaction (2) rarely occurs or is used. There are inherent economic disadvantages to each of these reactions. Moreover, these reactions, which oxidize $SiCl_4$ through pyrolysis and hydrolysis, have the disadvantage of producing chlorine or a very strong acid by-product.

While the first two reactions occur theoretically, an auxiliary fuel is generally needed to achieve pyrolytic temperature. The hydrolysis of $SiCl_4$ results in the formation of hydrochloric acid (HCl), a by-product that is detrimental not only to many deposition substrates and to reaction equipment but also is harmful to the environment. Emission abatement systems have proven to be very expensive due to down-time, loss, and maintenance of equipment caused by the corrosiveness of HCl.

Notwithstanding the problems with handling and disposal of the HCl by-product, the third reaction, hydrolysis of $SiCl_4$, tends to be the preferred commercial method of producing fused silica for economic reasons.

Though hydrolysis of $SiCl_4$ has been the preference of industry for producing high purity fused silica over the years, the enhanced global sensitivity to environmental protection has led to more strict government regulation of point source emissions, prompting a search for less environmentally pernicious feedstocks. Point source emission regulations require that HCl, the by-product of hydrolyzing $SiCl_4$, as well as many particulate pollutants be cleansed from exhaust gases prior to their release into the atmosphere. The economic consequences of meeting these regulations have made commercial production of fused silica from halide-based feedstocks less attractive to industry.

As an alternative, high purity fused quartz or silica has also been produced by thermal decomposition and oxidation of silanes. However, this requires taking safety measures in handling because of the violent reaction that results from the introduction of air into a closed container of silanes. Silanes react with carbon dioxide, nitrous oxide, oxygen, or water to produce high purity materials that are potentially useful in producing, among other things, semiconductor devices. However, silanes have proven to be much too expensive and reactive to be considered for commercial use except possibly for small scale applications requiring extremely high purity.

A number of patents describe the production of high purity metal oxides, particularly fused silica, from a chloride-based feedstock. These patents disclose equipment with a number of burner arrangements and feedstock delivery systems to achieve oxidation of a metal chloride through flame hydrolysis or pyrolysis. Illustrative of this is U.S. Pat. No. 4,491,604 to Lesk et al., where trichlorosilane, dichlorosilane, and silicon tetrachloride are flame hydrolyzed to form soot, and U.S. Pat. No. 3,666,414 to Bayer, where silicon halides such as trichlorosilane or chloroform are flame hydrolyzed. In similar processes, U.S. Pat. Nos. 3,486,913 to Zirngibl ("Zirngibl") and 2,269,059 to McLachlan ("McLachlan") teach oxidation of halides. Volatilized inorganic halide components such as $TiCl_4$, $CrCl_3$, $CrO_2Cl_2$, $SiCl_4$, $AlCl_3$, $ZrCl_4$, $FeCl_2$, $FeCl_3$, $ZnCl_2$, or $SnCl_4$ that are oxidized with air, steam, or oxygen are employed in Zirngibl, while silicon halides, ethyl silicate, methyl borate, $TiCl_4$, $AlCl_3$, and $ZrCl_4$ are used by McLachlan.

U.S. Pat. No. 3,416,890 to Best et al. discloses a process for preparing finely-divided metal or metalloid oxides by the decomposition of a metal or metalloid perhalide in a flame produced by the combustion of an oxidizing gas and an auxiliary fuel, such as carbon disulfide, carbon selenide sulfide, thiophosgene, or other hydrogen-free compounds containing sulfur bonded directly to carbon.

U.S. Pat. No. 2,239,551 to Dalton discloses a method of making glass by decomposing a gaseous mixture of glass-forming compounds in a flame of combustible gas. The mixture is used in the formation of anhydrous oxides of silicon, aluminum, and boron. Decomposable compounds such as ethyl or methyl silicate, trichlorosilane, and silicon tetrafluoride may be substituted for silicon tetrachloride; methyl borate or boron hydride may be substituted for boron fluoride, etc.

U.S. Pat. No. 2,326,059 to Nordberg details a technique for making silica-rich ultra-low expansion glass by vaporizing tetrachlorides of Si and Ti into the gas stream of an oxy-gas burner, depositing the resultant mixture to make a preform, vitrifying the preform at 1500° C. to make an opal glass, and firing the opal preform at a higher temperature to cause it to become transparent.

U.S. Pat. No. 2,272,342 to Hyde discloses a method of producing glass articles containing vitreous silica by vaporizing a hydrolyzable compound of silicon such as silicon chloride, trichlorosilane, methyl silicate, ethyl silicate, silicon fluoride, or mixtures thereof, using a water bath. The silicon compound vapor is hydrolyzed by water vapor in the flame of a burner, and the resulting amorphous oxide is collected and subsequently sintered until a transparent glass results.

U.S. Pat. No. 4,501,602 to Miller et al. describes the production of particulate metal oxide soot through the vapor phase deposition of β-diketonate complexes of metals from Groups IA, IB, IIA, IIB, IIIA, IIIB, IVA, IVB, and the rare earth series of the Periodic Table.

Also cited in the art are several patents where silane compounds have been used in producing high purity fused silica.

Japanese Pat. Application No. 90838-1985 to Okamoto et al., discloses a method of doping quartz glass by utilizing an ester silane expressed by the general formula $R^1{}_n Si(OR^2)_{4-n}$ and one or more dopants defined by the formulae $Ge(OR^3)_3$, $B(OR^3)_3$, and $PH_3$, where $R^1$ is a hydrogen atom, methyl or ethyl group; $R^2$ is a methyl or ethyl group; $R^3$ is an univalent hydrocarbon group; and n is an integer ranging between 0 and 4. A great many organometallic compounds are disclosed, including methyltrimethoxysilane, dimethyldimethoxysilane, trimethylmethoxysilane, tetramethoxysilane, methyltriethoxysilane, and tetraethoxysilane.

U.S. Pat. No. 3,117,838 to Sterling describes a method of producing very pure fused quartz or silica by the combined thermal decomposition and oxidation of silanes where either carbon dioxide, nitrous oxide, or water vapor and a silane are fed into a burner or torch jet, and the flame is allowed to impinge on a carbon substrate upon which silica is deposited.

U.S. Pat. No. 4,810,673 to Freeman discloses a method of synthesizing high quality silicon oxides by chemical vapor deposition of a source gas mixture which includes a halogenated silane component and an oxygen source, namely, dichlorosilane and nitrous oxide.

U.S. Pat. No. 4,242,487 to Hasegawa et al. discloses a method of producing a heat resistant, semi-inorganic compound that is useful as a material for various heat-resistant materials by reacting an organoborosiloxane compound with at least one of the group of aliphatic polyhydric alcohols, aromatic alcohols, phenols, and aromatic carboxylic acids at 250° C. to 450° C. in an inert atmosphere.

As is clear from the preceding discussion, it is highly desirable for both economic and environmental reasons to find halide-free silicon compounds to replace the silicon halide feedstocks typically used to produce high purity silica glass. Such halide-free starting materials would produce carbon dioxide and water, rather than noxious and corrosive HCl, as by-products of the glass-making process.

U.S. Pat. No. 5,043,002 to Dobbins et al., the disclosure of which is hereby incorporated by reference, discloses the usefulness of polymethylsiloxanes, in particular, polymethylcyclosiloxanes such as hexamethylcyclotrisiloxane, octamethylcyclotetrasiloxane ("OMCTS"), and decamethylcyclopentasiloxane in a method of making fused silica glass. The method can be applied to the production of a non-porous body of silica glass doped with various oxide dopants and for the formation of optical waveguide fibers. U.S. Pat. No. 5,043,002 to Dobbins et al. also discloses the use of hexamethyldisiloxane; see also reference to hexamethyldisiloxane in Japanese Patent Application No. 1-138145.

U.S. Pat. No. 5,152,819 to Blackwell et al., the disclosure of which is hereby incorporated by reference, describes additional halide-free silicon compounds, in particular, organosilicon-nitrogen compounds having a basic Si-N-Si structure, siloxasilazones having a basic Si-N-Si-O-Si structure, and mixtures thereof, which may be used to produce high purity fused silica glass without the concomitant generation of corrosive, polluting by-products.

Although use of halide-free silicon compounds as feedstocks for fused silica glass production, as described in U.S. Pat. Nos. 5,043,002 and 5,152,819, avoids the formation of HCl, some problems remain, particularly when the glass is intended for the formation of optical waveguide fibers. Applicants have found that, in the course of delivering a vaporized polyalkylsiloxane feedstock to the burner, high molecular weight species can be deposited as a gel in the line carrying the vaporous reactants to the burner or within the burner itself. This leads to a reduction in the deposition rate of the soot preform that is subsequently consolidated to a blank from which an optical waveguide fiber is drawn. It also leads to imperfections in the blank that will produce defective or unusable optical waveguide fiber from the affected portions of the blank.

SUMARY OF THE INVENTION

The present invention is directed to a method for making fused silica glass. A liquid, preferably halide-free, silicon-containing compound capable of being converted by thermal oxidative decomposition to $SiO_2$ is provided and introduced directly into the flame of a combustion burner, thereby forming finely divided amorphous soot. The amorphous soot is deposited on a receptor surface where, either substantially simultaneously with or subsequently to its deposition, the soot can be consolidated into a body of fused silica glass. The body of fused silica glass can then be either used to make products directly from the fused body, or the fused body can be further treated, e.g., by drawing to make optical waveguide fiber further see, e.g., the end-uses described in the U.S. Pat. Application No. 08/574,961 entitled "Method for Purifying Polyalkylsiloxanes and the Resulting Products", the contents of which are hereby incorporated by reference.

The invention further comprises an apparatus for forming fused silica from liquid, preferably halide-free, silicon-containing reactants that comprises: a combustion burner which, in operation, generates a conversion site flame; an injector for supplying a liquid silicon-containing compound to the flame to convert the compound by thermal oxidative decomposition to a finely divided amorphous soot; and a receptor surface positioned with respect to said combustion burner to permit deposition of the soot on the receptor surface.

Forming amorphous fused $SiO_2$ soot particles from a feedstock comprising a volatile silicon-containing compound typically entails vaporization of that compound prior to its introduction into a combustion burner. In the previously mentioned U.S. Pat. No. 5,043,002 to Dobbins et al., for example, a carrier gas such as nitrogen is bubbled through a silicon-containing reactant compound, preferably a halide-free compound such as octamethylcyclotetrasiloxane. A mixture of the reactant compound vapor and nitrogen is transported to the burner at the reaction site, where the reactant is combined with a gaseous fuel/oxygen mixture and combusted.

Although use of halide-free silicon compounds as feedstocks for fused silica glass production, as described in U.S. Pat. Nos. 5,043,002 and 5,152,819, avoids the formation of HCl, some problems remain, particularly when the glass is intended for the formation of high quality optical products such as optical waveguide fibers. Applicants have found, as disclosed in copending U.S. pat. application No. 08/574,961 entitled "Method for Purifying Polyalkylsiloxanes and the Resulting Products", that the presence of high boiling point impurities in, for example, a polyalkylsiloxane feedstock, can result in the formation of gel deposits in the vaporization and delivery systems carrying the vaporous reactants to the burner or within the burner itself. Such polymerizing and gelling of the siloxane feedstock inhibits the controllability and consistency of the silica manufacturing process. This problem is aggravated when an oxidizing carrier gas such as oxygen is included in the reactant vapor stream, because oxidizers can catalyze polymerization of the siloxane feedstock. This leads to a reduction in the deposition rate of the soot preform that is subsequently consolidated to a blank from which an optical waveguide fiber is drawn. Furthermore, particulates of the high molecular weight, high boiling impurities may be deposited on the optical waveguide fiber blank, resulting in "defect" or "clustered defect" imperfections that adversely affect the quality of the subsequently drawn optical waveguide fiber and can require scrapping of an entire blank.

Defects are small (i.e. 0.1 to 4.0 mm in diameter) bubbles in a glass body. They can be formed in fused silica by an impurity, such as uncombusted gelled polyalkylsiloxane. A very small particle of siloxane gel can be the initiation site for a defect. The siloxane decomposes at high temperature after being deposited on the glass body, giving off gases which cause the formation of the defect.

Thermophoresis is the process by which soot is attracted to the preform. In fact, it produces the driving force which moves the particles towards the cooler preform. The hot gases from the burner pass around the preform during laydown; the soot particles do not have sufficient momentum by combustion alone to strike the preform. Thermophoresis moves particles in a temperature gradient from hot regions to cooler regions. The burnt gases from a burner are hotter than the preform. As these gases pass around the preform, a temperature gradient is produced. Hot gas molecules have higher velocity than cold gas molecules. When hot gas molecules strike a particle, they transmit more momentum to the particle than a cold gas molecule does. Thus, particles are driven towards the colder gas molecules and, in turn, toward the preform.

Clustered defects are larger glass defects found in optical waveguide fiber preforms. They are made up of a series of defects in the form of a line or a funnel- or flower-shaped cluster. A large particle of gel can be the initiation site for a clustered defect. After the gel particle has struck the porous preform, it causes a raised area to stand out from the preform surface. Because the clustered defect is a raised site, more heat transfer passes to this site. Because of this increased heat transfer, more thermophoresis occurs at this site, causing the imperfection to grow and leave behind a string of defects. As a result of the clustered defect, the affected portion of the optical waveguide fiber preform cannot be consolidated normally, and the consequent irregularity in the blank yields defective optical waveguide fiber. In the case of a typical 100 kilometer consolidated blank, which has a diameter of 70 millimeters (mm) and a length of 0.8 meter (m), the presence of one clustered defect on the surface of the blank will typically result in the loss of 5 kilometers of optical waveguide fiber on drawing. In the case of a larger consolidated blank, the negative impact of a single clustered defect is proportionately higher. In a 250 kilometer consolidated blank, which has a diameter of 90 mm and a length of 1.8 m, one clustered defect on the surface of the blank will typically result in the loss of 8 kilometers of optical waveguide fiber on drawing.

The applicants have now discovered that the above-described problem is inhibited by delivering the siloxane feedstock in the liquid form to the conversion site during the silica manufacturing process. By delivering the siloxane feedstock as a liquid instead of as a vapor, gelling of the siloxane feedstock is prevented in that exposure of the siloxane feedstock to the high temperature environments of a vaporizer and vapor delivery system are avoided. This improves the yield and quality of the fused silica produced and also reduces the maintenance requirements of the production system.

DETAILED DESCRIPTION OF THE INVENTION

The present invention is directed to a method for making a high purity fused silica glass. The invention provides a method of inhibiting the gelling of a siloxane feedstock in the silica manufacturing process by delivering the siloxane feedstock to the conversion site in a liquid form. Since the hot environments of the vaporizer and vapor delivery system, which promote the formation of troublesome gels, are avoided, the silica manufacturing process is improved. The siloxane feedstock is delivered to the conversion site as a liquid and does not vaporize until just prior to or simultaneous with being converted into amorphous silica soot. The amorphous silica soot is then deposited on a receptor surface. Either substantially simultaneously with or subsequently to its deposition, the soot can be consolidated into a body of fused silica glass, from which e.g., an optical waveguide fiber can be formed by drawing.

The invention further comprises a silica manufacturing apparatus which includes a siloxane liquid feedstock tank for containing the siloxane liquid feedstock and a siloxane liquid feedstock transporting conduit for delivering the siloxane liquid feedstock to an injector which injects the liquid feedstock into the conversion site where it is decomposed in a combustion burner flame to form a finely divided amorphous silica soot which is deposited on a receptor surface.

The body of fused silica glass can be doped with an oxide dopant wherein, in addition to the liquid siloxane feedstock, a dopant compound that is capable of being converted by oxidation or flame hydrolysis to a member of the group consisting of $P_2O_5$ and a metal oxide having a metal component selected from Groups IA, IB, IIA, IIB, IIIA, IIIB, IVA, VA, and the rare earth series of the Periodic Table of Elements is introduced into the flame of the burner. The oxide-doped fused silica glass so obtained can be, e.g., drawn into an optical waveguide fiber.

Figure 1:
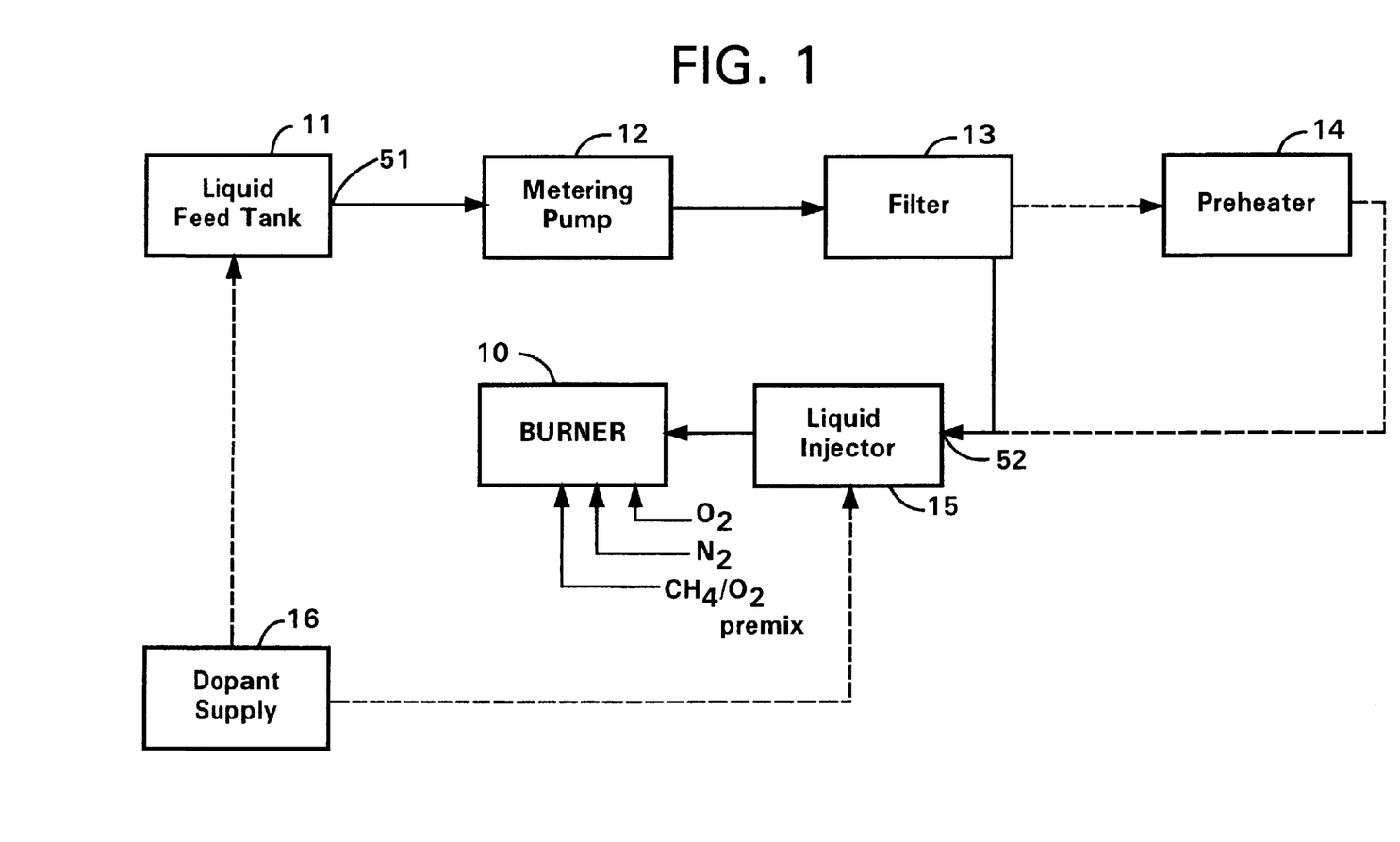
FIG. 1 is a block diagram of a reactant delivery system in accordance with the present invention.

FIG. 1 schematically depicts a system for delivering liquid siloxane feedstock and, optionally, dopant-providing compounds to burner 10. A liquid siloxane feedstock such as a polymethylcyclosiloxane is stored in feedstock tank 11. Feedstock tank 11 is connected to liquid feedstock injector 15 at the reactant introduction site via a liquid feedstock transporting conduit system that can, if desired, include metering pump 12, optional filter 13, and preheater 14. Said liquid feedstock transporting conduit has a first terminal end 51 and a second terminal end 52. The siloxane feedstock liquid from tank 11 is transferred through the liquid feedstock transporting conduit by pump 12 through filter 13 to optional preheater 14. The liquid delivered through filter 13 is under sufficient pressure to substantially prevent and inhibit its volatilization in preheater 14, which is optionally employed to warm the liquid reactant prior to its introduction into burner 10 and avoids the high temperatures of a vaporizer which normally promote gel formation. The burner preferably is conventionally provided with inner shield gas, outer shield gas, and a mixture of methane and oxygen for the flame, as described, for example, in U.S. Pat. No. 4,165,223 to D.R. Powers, which is hereby incorporated by reference.

The liquid reactant is conveyed from optional filter 13 or optional preheater 14 through second terminal end 52 to liquid injector 15, which delivers the liquid to burner 10. Injector 15 comprises a device for delivering the liquid reactant, either as a liquid stream or as atomized liquid particles, directly into the flame of burner 10. We generally refer in the discussion to the reactant as being in "liquid" form. What we mean by that expression is that the reactant is in a substantially liquid state. Some small portion of the reactant may be in vapor form, particularly where preheater 14 is employed, or where a nitrogen blanket over the liquid is employed. A small portion of the reactant can be in vapor form as delivered to the combustion site without adversely affecting the operation of the invention.

Liquid injector 15 can comprise, for example, a syringe provided with a fine needle, by which a liquid stream can be injected at high velocity into the burner flame. Although a syringe can be used on a small scale, commercial operations will require a reasonable large scale equivalent, e.g., an atomizer.

Several types of atomizing means capable of forming very small particles of liquid are known in the atomization art as disclosed in *Atomization and Sprays*, by Arthur H. Lefebure, Hemisphere Publishing Co., 1989, which is incorporated herein by reference. Atomizers can be operated by various energy sources such as liquid, gas, mechanical, electrical and vibrational, and may be categorized as, for example, jet, swirl, jet-swirl, pneumatic, rotary, acoustic, ultrasonic, and electrostatic. Preferably, a jet atomizer is used; even more preferably, the jet atomizer is a swirl-jet atomizer, which swirls the liquid and then, as atomizers generally do, squirts the liquid at high velocity out of a small orifice. Various types of atomizers are discussed in *Liquid Atomization*, by L. Bayvel and Z. Orzechowski, Taylor & Francis, (1993), which is hereby incorporated by reference.

Another preferred type is a pneumatic atomizer operated by nitrogen or air pressure. In particularly preferred embodiments, the atomizer can be incorporated into the structure of the combustion burner.

The atomized particles of the siloxane reactant compound are combusted in a burner fueled by, preferably, a combination of methane and oxygen. The atomized reactant particles can be conveyed from the atomizer to the burner flame by a carrier gas such as nitrogen, which is preferably the atomizing gas.

Figure 2:
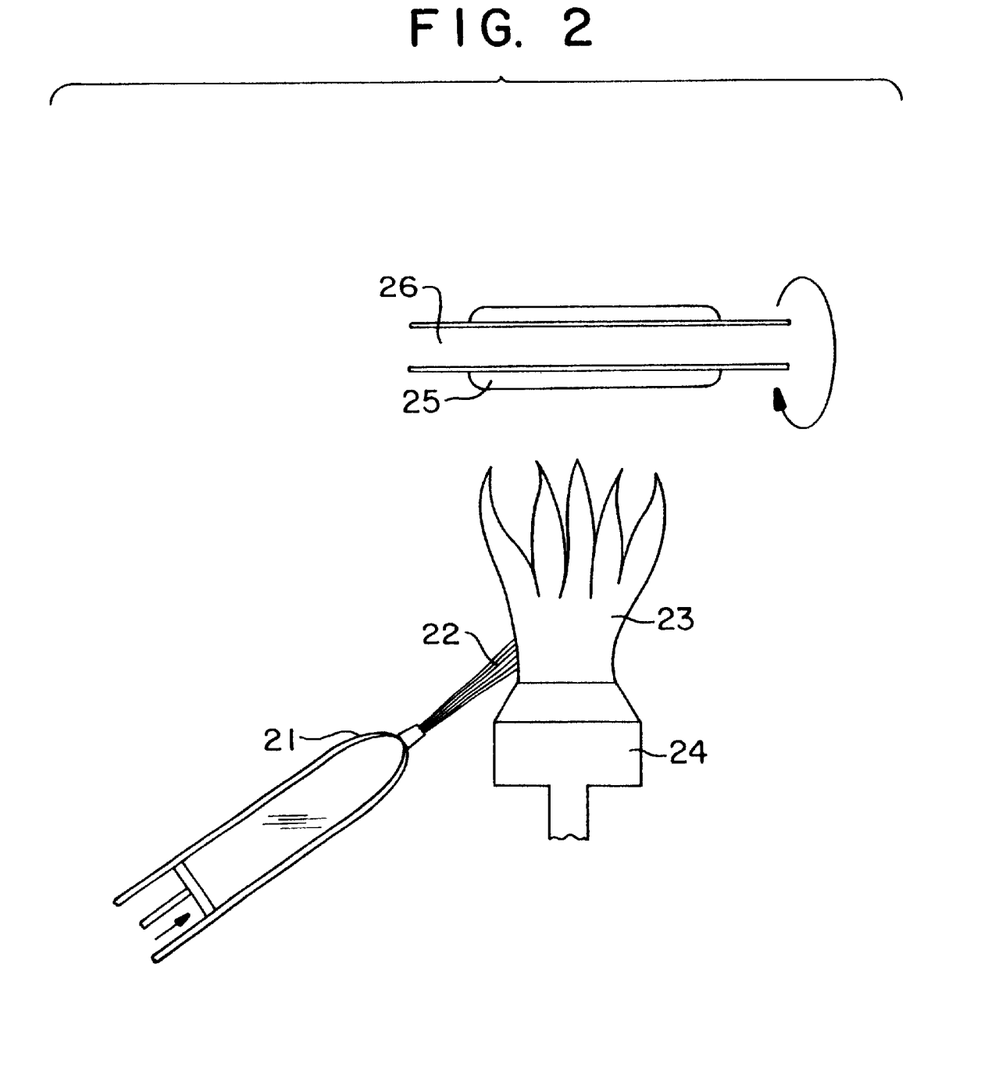
FIG. 2 is a schematic representation of liquid reactant provided to the flame of a burner from a syringe in accordance with the present invention.

FIG. 2 schematically depicts an apparatus in accordance with the present invention, in which syringe 21 injects a liquid reactant stream 22 into conversion site flame 23 produced by burner 24. Thermal oxidative decomposition of the reactant produces finely divided amorphous soot 25, which is deposited on rotatable mandrel 26.

Figure 3:
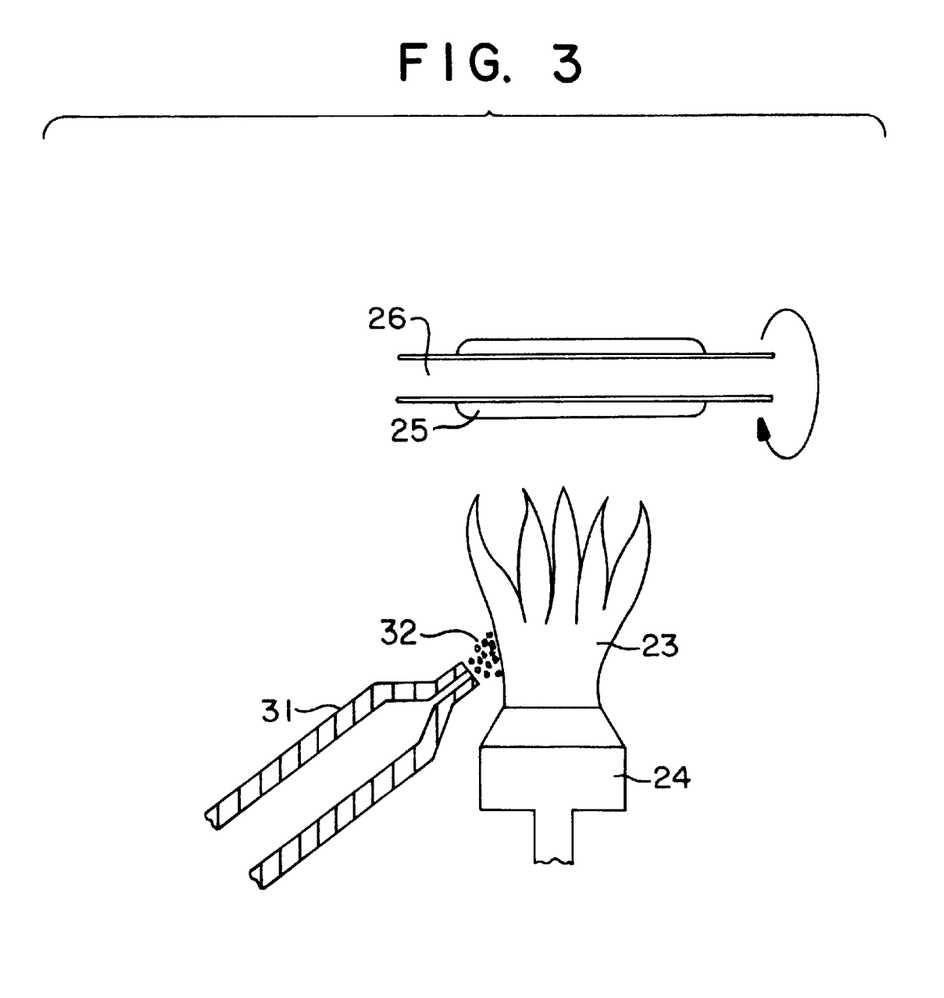
FIG. 3 is a schematic representation of liquid reactant particles being provided to the flame of a burner from a transducer in accordance with the present invention.

FIG. 3 is a schematic representation of another embodiment of the apparatus of the present invention, whereby atomizer 31 injects small liquid reactant particles 32 into flame 23 produced by burner 24. Combustion of the reactant yields soot 25, which is deposited on rotatable mandrel 26.

Figure 4:
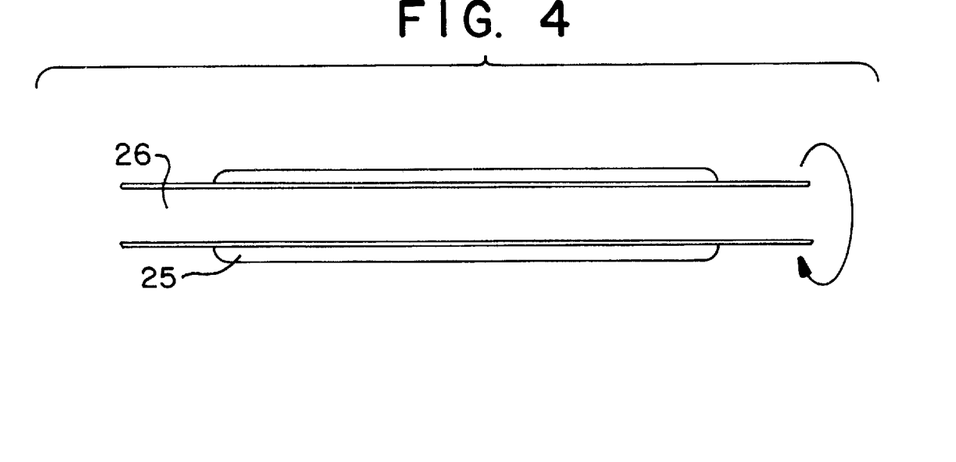
FIG. 4 is a schematic representation of an atomizer incorporated into the structure of a burner in accordance with the present invention.

FIG. 4 is a cross-sectional view of a preferred embodiment of the apparatus of the present invention. Here, burner 40 incorporates within its structure atomizer 41, which injects very finely atomized liquid reactant particles into flame 23. As with the previously described embodiments, amorphous soot 25 produced by combustion of the liquid reactant is collected on rotatable mandrel 26.

As shown in FIG. 4, burner 40 comprises a series of concentric channels surrounding atomizer 41. A stream of nitrogen may be delivered via innermost channel 43 to forestall premature contact of reactant particles 42 with oxygen, which may be delivered to flame 23 through channels 44 and 45. A premix of oxygen and a fuel such as methane is conducted to the flame through outermost channel 46. A burner fitted with an atomizing injector, such as the embodiment depicted in FIG. 4, produces a wide soot stream, which achieves improved concentricity of the core and cladding regions of a subsequently formed optical waveguide fiber.

The most preferred atomizer unit 53 of the invention as shown in FIG. 4 is comprised of an airblast atomizer. With such an airblast atomizer, the liquid siloxane feedstock is atomized by the kinetic energy of a flowing gas stream such as from inner most channel 43. High velocity gas is utilized in atomizing the feedstock. This produces atomized liquid projections 42 with a velocity in the range of 0.5 to 50.0 m/sec. The use of an inert gas is preferred with the airblast atomizer. $N_2$ gas is particularly preferred with the invention, but a non-inert gas such as $O_2$ could be used but will not help to prevent combustion of the feedstock prior to full vaporization of the liquid feedstock. Use of $N_2$ gas as the airblasting gas helps to blanket the feedstock from the oxygen in the flame and prevents burner buildup. With the use of airblast atomizer in the invention, the high velocity blast gas is deployed in an effective manner to achieve a beneficial level of atomization of the siloxane at the burner and in the flame.

In practicing the invention, even though it is preferred to have atomizer unit 53 as an integral part of the burner unit, it is possible to use an airblast atomizer which is spatially separated from the burner, as with atomizers 21 and 31 in FIG. 2 and FIG. 3.

The apparatus can also be provided with dopant supply tank 16, shown in FIG. 1, which contains a compound capable of being converted by oxidation or flame hydrolysis to $P_2O_5$ or to a metal oxide whose metallic component is selected from Groups IA, IB, IIA, IIB, IIIA, IIIB, IVA, IVB, VA, and the rare earth series of the Periodic Table. These oxide dopants combine with the silica generated in the burner to provide doped silica glass, which can be subsequently formed into optical waveguide fibers.

The compound that provides the silica glass dopant can be provided to feed tank 11 from dopant supply 16 of FIG. 1. Alternatively, the dopant can be delivered from supply 16 to liquid injector 15 via a separate metering pump and optionally a filter (not shown) analogous to the delivery system used for the silicon-containing compound.

In accordance with the invention, the preferably halide-free, silicon-containing reactant compound preferably comprises a polyalkylsiloxane, for example, hexamethyldisiloxane. More preferably, the polyalkylsiloxane comprises a polymethylcyclosiloxane. Most preferably, the polymethylcyclosiloxane is selected from the group consisting of hexamethylcyclotrisiloxane, octamethylcyclotetrasiloxane, decamethylcyclopentasiloxane, dodecamethylcyclohexasiloxane, and mixtures thereof.

As disclosed in copending U.S. patent application No. 08/574,961, the use of such siloxane feedstocks as octamethylcyclotetrasiloxane poses problems with the conventional silica manufacturing process in that the siloxane feedstock is prone to polymerize and form gels, which clog and impede the feedstock vaporizer and vaporized feedstock delivery system.

The following examples further illustrate the invention.

EXAMPLE 1

Soot Generation by Injection of Liquid Reactant into a Flame with a Syringe

A stream of liquid octamethylcyclotetrasiloxane (OMCTS) was injected into a burner flame of a lathe fitted with a glass rod using a syringe provided with a 0.01-inch diameter needle. The resulting porous soot particles containing $SiO_2$ were collected on the rotating one-inch diameter glass rod. This procedure demonstrates the feasibility of obtaining $SiO_2$ by combustion of the siloxane feedstock compound in liquid form.

EXAMPLE 2

Generation of Soot Using an Ultrasonic Transducer Atomizer as Injector

Liquid octamethylcyclotetrasiloxane (OMCTS) was delivered to a combustion burner via a Vibra-Cell® 20-khz ultrasonic transducer atomizer (available from Sonics & Materials, Inc., Danbury, Conn.) inserted down the centerline of the burner. The atomizer was surrounded by two inner rings of oxygen supply and an outer ring of premixed $CH_4/O_2$. The following flow rates were employed: octamethylcyclotetrasiloxane (OMCTS), 11 grams per minute; oxygen, 10 standard liters per minute (SLPM); premix, 10 SLPM $CH_4$ and 8.4 SLPM $O_2$.

Combustion was continued for about 10 minutes. A good deposit of $SiO_2$ soot was collected on the mandrel, further demonstrating the practicality of producing $SiO_2$ from a siloxane feedstock introduced as small liquid particles into the burner flame.

EXAMPLE 3

Soot Generation by an Atomizing Combustion Burner

An atomizing burner was constructed as depicted in FIG. 4. Various dimensions of atomizer 41 and the surrounding channels were tested, as follows:

inner diameter of atomizer 41: 0.007 to 0.015 inch
inner diameter of channel 43: 0.036 to 0.050 inch
outer diameter of channel 43: 0.048 to 0.063 inch Using an atomizer 41 having an 0.015-inch inner diameter, particles of soot were generated from octamethylcyclotetrasiloxane (OMCTS) for 65 minutes. Flow rates were as follows:

Premix through channel 46: 10 SLPM $CH_4$ and 8 SLPM $O_2$.
$O_2$ through channels 44 and 45: 26 SLPM.
$N_2$ through channel 43: 5.6 SLPM.
Octamethylcyclotetrasiloxane (OMCTS) through atomizer 41: 6 milliliters per minute (ml/min) for first five minutes, then 10 ml/min for next 60 minutes.

The target or bait, a 1-inch diameter glass rod, was set to rotate between 1 and 5 rotations per second, traversing back and forth at about 15 meters per minute. The burner to bait receptor surface distance was about 6.5 inches.

Complete combustion of the reactant octamethylcyclotetrasiloxane (OMCTS) was achieved, and the target weight increased by 247 grams over the 65-minute deposition period (3.8 grams/minute). The soot was subsequently consolidated in a furnace, yielding glass that was clear and free of visible defects.

These results demonstrate the successful use of an atomizing burner of the invention to combust a liquid siloxane feedstock and deposit soot on a receptor surface at a good rate.

The invention has been described in detail for the purpose of illustration, but it is understood that such detail is solely for that purpose and variations can be made therein by those skilled in the art without departing from the spirit and scope of the invention, which is defined by the following claims.

What is claimed:

1. A method of making silica comprising the steps of:
   a) delivering a liquid siloxane feedstock in non-atomized liquid form to a conversion site;
   b) atomizing said liquid siloxane feedstock at the conversion site with the assistance of a gas to form a dispersion of liquid droplets of said feedstock and imparting a velocity of greater than 10 m/sec to the atomized siloxane feedstock; and
   c) converting said atomized siloxane feedstock at the conversion site into silica.

2. The method of claim 1, further comprising delivering a dopant compound capable of being converted by oxidation to an oxide and having a metal component selected from the group consisting of the Groups IA, IB, IIA, IIB, IIIA, IIIB, IVA, VA and the rare earth series of the Periodic Table of Elements to the conversion site.

3. The method of claim 1 wherein a velocity of greater than 20 m/sec is imparted to the atomized siloxane feedstock.

4. A method as claimed in claim 1, wherein said step of atomizing said liquid siloxane feedstock at the conversion site, further comprises the step of airblast atomizing said liquid siloxane feedstock.

5. A method as claimed in claim 4, wherein said step of airblast atomizing said liquid siloxane feedstock further comprises the step of atomizing the liquid siloxane feedstock with the kinetic energy of a flowing gas stream.

6. A method as claimed in claim 4, wherein said step of airblast atomizing said liquid siloxane feedstock further comprises the step of airblasting said liquid siloxane feedstock with an inert gas.

7. A method as claimed in claim 6, wherein said step of airblasting said liquid siloxane feedstock with an inert gas comprises the step of airblasting said liquid siloxane feedstock with nitrogen gas.

8. A method as claimed in claim 1, wherein said step of converting said atomized siloxane feedstock at the conversion site into silica, further comprises the step of decomposing said atomized siloxane feedstock in a flame.

9. A method of making silica soot, said method comprising:
   a) providing a conversion site, said conversion site for converting a silica producing feedstock into silica;
   b) positioning an airblast atomizer proximate said conversion site;
   c) delivering a silica producing feedstock in liquid form to said airblast atomizer;
   d) airblast atomizing said silica producing feedstock with a gas and imparting a velocity of greater than 10 m/sec to the atomized liquid feedstock;
   e) delivering said atomized liquid feedstock directly into said conversion site; and
   f) inhibiting the vaporization of said liquid feedstock prior to delivery to the conversion site.

10. The method as claimed in claim 1, further comprising the steps of:
    d) depositing silica as silica soot on a receptor surface; and
    e) consolidating said soot into a body of fused silica glass.

11. A method of making silica, said method comprising:
    a) providing a conversion site, said conversion site for converting a silica producing feedstock into silica;
    b) positioning a pneumatic atomizer at said conversion site;
    c) delivering a silica producing feedstock in liquid form to said pneumatic atomizer;
    d) pneumatically atomizing said silica producing feedstock to form a dispersion of liquid droplets of said feedstock and imparting a velocity of greater than 10 m/sec to the atomized liquid feedstock;
    e) delivering said atomized liquid feedstock directly into said conversion site; and
    f) inhibiting the vaporization of said liquid feedstock prior to delivery to the conversion site.

12. The method of claim 11 wherein a velocity of greater than 20 m/sec is imparted to the atomized siloxane feedstock.

13. A method of making silica, said method comprising:
    a) providing a conversion site, said conversion site for converting a silica producing feedstock into silica;
    b) positioning a jet atomizer at said conversion site;
    c) delivering a silica producing feedstock in liquid form to said jet atomizer;
    d) jet atomizing said silica producing feedstock to form a dispersion of liquid droplets of said feedstock and imparting a velocity of greater than 10 m/sec to the atomized liquid feedstock;
    e) delivering said atomized liquid feedstock directly into said conversion site; and
    f) inhibiting the vaporization of said liquid feedstock prior to delivery to the conversion site.

14. The method of claim 13 wherein a velocity of greater than 20 m/sec is imparted to the atomized siloxane feedstock.

15. A method of making silica comprising the steps of:
    a) delivering a liuid siloxane fedstock in non-atomized liquid form to a conversion site;
    b) atomizing said liquid siloxane feedstock at the conversion site to form a dispersion of liquid droplets of said feedstock and imparting a velocity of greater than 10 m/sec to the atomized siloxane feedstock; and
    c) converting said atomized siloxane feedstock at the conversion site into silica.

16. The method of claim 15 wherein a velocity of greater than 20 m/sec is imparted to the atomized siloxane feedstock.

17. The method as claimed in claim 10, wherein the receptor surface is a mandrel.

18. The method as claimed in claim 10, wherein the receptor surface is a flat substrate.

19. The method as claimed in claim 18, wherein the step of consolidating the soot occurs substantially simultaneously with the step of depositing the soot.

20. The method of claim 15 wherein said liquid siloxane feedstock is atomized at the conversion site with the assistance of a gas.

\* \* \* \* \*

UNITED STATES PATENT AND TRADEMARK OFFICE
CERTIFICATE OF CORRECTION

PATENT NO. : 6,565,823 B1
DATED : May 20, 2003
INVENTOR(S) : Hawtof, Daniel et al.

It is certified that error appears in the above-identified patent and that said Letters Patent is hereby corrected as shown below:

Column 12,
Line 22, "a) delivering a liuid siloxane fedstock in non-atomized" should be
-- a) delivering a liquid siloxane feedstock in non-atomized --

Signed and Sealed this

Twelfth Day of August, 2003

JAMES E. ROGAN
*Director of the United States Patent and Trademark Office*